No. 673,283. Patented Apr. 30, 1901.
T. H. NANCE.
GIN SAW SIDE FILER AND GAGE.
(Application filed Oct. 31, 1900.)
(No Model.) 2 Sheets—Sheet 1.
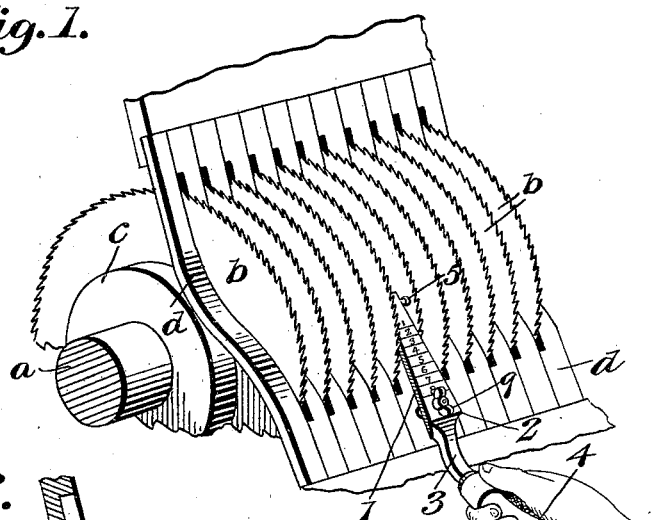
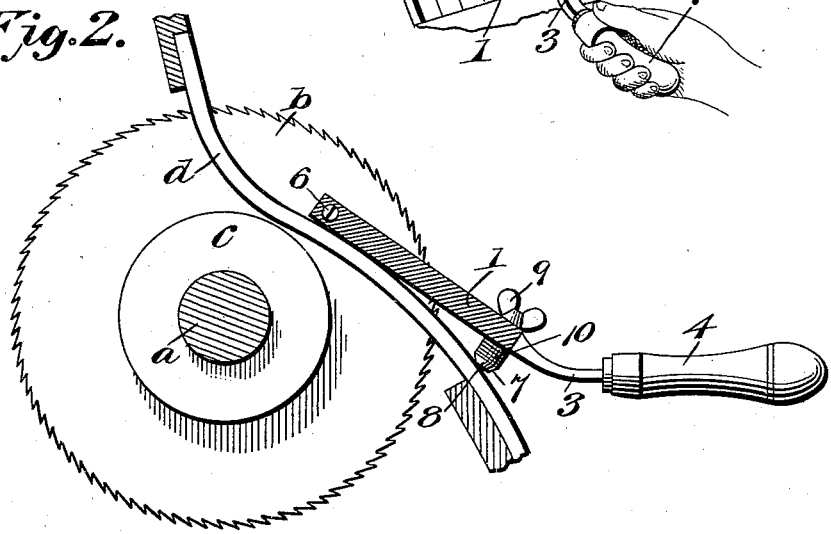
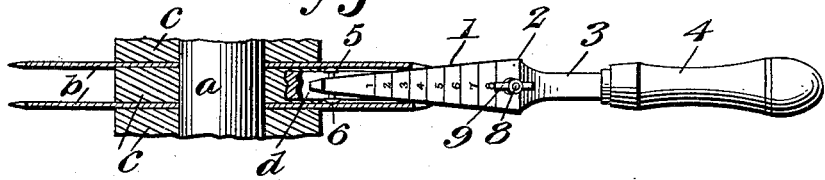
Turner H. Nance Inventor No. 673,283. Patented Apr. 30, 1901.
T. H. NANCE.
GIN SAW SIDE FILER AND GAGE.
(Application filed Oct. 31, 1900.)
(No Model.) 2 Sheets—Sheet 2.
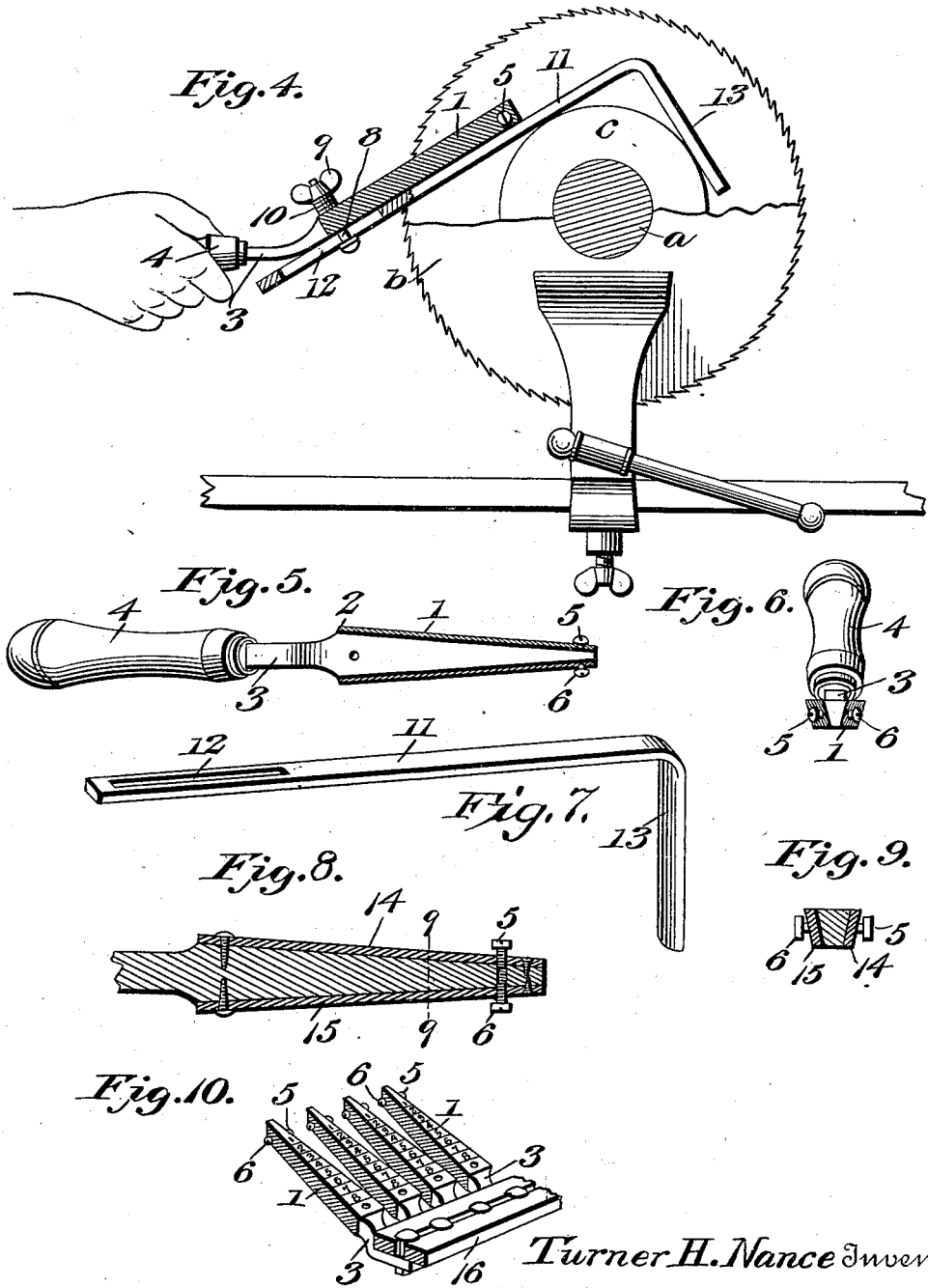
Turner H. Nance Inventor

UNITED STATES PATENT OFFICE.

TURNER HUNT NANCE, OF TALLADEGA, ALABAMA.

GIN-SAW SIDE-FILER AND GAGER.

SPECIFICATION forming part of Letters Patent No. 673,283, dated April 30, 1901.

Application filed October 31, 1900. Serial No. 35,060. (No model.)

*To all whom it may concern:*

Be it known that I, TURNER HUNT NANCE, a citizen of the United States, residing at Talladega, in the county of Talladega and State of Alabama, have invented a new and useful Gin-Saw Side-Filer and Gager, of which the following is a specification.

My present invention relates to a novel device for restoring the original form of gin-saws by filing the opposite sides of the teeth after their points have been worn away by continued use. In its original form each tooth of a gin-saw tapers to a sharp point from the opposite side faces of the saw, and therefore the distance between the points of the teeth of two adjacent saws or saw-sections of the cylinder is lessened when these points have become worn, and the operation of the gin is therefore rendered less effective.

One object of my invention, therefore, is to produce a simple device for side-filing the gin-saws to reset or gage the effective edges or tooth-points of the individual saw-sections without necessity for removing the saw-cylinder from the gin, but at the same time applicable for side-filing the individual saws or cylinder-sections when the latter are removed from the gin and are supported upon the bench.

A further object of the invention is to provide a filing device of the character described with an adjustable centering device for maintaining its proper position between a pair of saws and also with a scale designed to indicate to the user the extent to which the file may be introduced between the saws in different makes of gins in order that those unskilled in such work may be enabled to side file or dress the saws without danger of overdoing it, and thereby injuring the saw-cylinder.

A still further object of the invention is to so construct the file as to insure its contact with the saw entirely across the face of the file, also to enable the file-faces to be renewed when worn, and to provide an adjustable rest designed to support the file upon the ribs of the gin when filing a saw-cylinder without removal, said adjustable rest serving also as a securing device for an adjustable gage-bar, with which the file is equipped to facilitate the filing of gin-saws removed from the gin.

Still another object of the invention in a further development thereof is the production of a side-filer for dressing a number of saws at the same time—as, for instance, all of the saws of a complete saw-cylinder.

To the accomplishment of the several objects stated and others subordinate thereto, as will hereinafter appear, the invention consists in the construction and arrangement of parts to be described, illustrated in the accompanying drawings, and succinctly defined in the appended claims.

In said drawings, Figure 1 is a perspective view of a portion of a gin and illustrating the manner in which my side-filer is employed to file the saws without removing the saw-cylinder from the gin. Fig. 2 is a sectional view, on a somewhat enlarged scale, illustrating more clearly the manner in which the file is supported upon and guided by the ribs disposed between the saws. Fig. 3 is a sectional view through a pair of saws, showing my filer centered between them in plan. Fig. 4 is an elevation showing the manner in which my device is employed for filing the saws of a saw-cylinder when the latter has been removed from the gin and is supported upon a bench. Fig. 5 is a bottom plan view of the filer with the adjustable rest and the gage-bar removed. Fig. 6 is an end elevation of the subject-matter of Fig. 5. Fig. 7 is a detail perspective view of the gage-bar detached. Fig. 8 is a longitudinal sectional view through the file equipped with removable file-faces or face-plates. Fig. 9 is a transverse sectional view on the line 9 9 of Fig. 8, and Fig. 10 is a perspective view of a portion of that form of my invention which comprehends a series of files connected to a common support.

Referring to the letters and numerals employed to designate corresponding parts throughout the views, *a* indicates the shaft of a gin; *b*, the individual circular saws thereon; *c*, the space-blocks disposed between the saws, and *d* the ribs, likewise disposed between the saws. The ribs *d* are ordinarily disposed in closely-associated series, as shown in Fig. 1, and are rearwardly inclined and formed with a compound curve, as shown more clearly in Fig. 2. Only a comparatively small segment of each saw projects beyond the ribs, and this segment is the only portion of the saw which is exposed when the breast is thrown up, and a filer to be effective without necessitating the removal of the saw-cylinder must be adapted to operate upon these projecting portions or segments of the saws to accomplish the side-filing.

In its simplest embodiment my filer comprises a file 1, having a more or less gradual taper from end to end and provided at its base or wide end 2 with an angular shank 3, to which is attached a handle 4, disposed in angular relation to the file in order that when the handle is held in a substantially horizontal position the file will be disposed at an angle convenient for its support upon that inclined portion of a rib adjacent to the lower end of the exposed edge of the saw, as best shown in Fig. 2 of the drawings. The file 1 is of tapering form in order to adapt it for the filing of saws more or less separated and for the further purpose of permitting the file to be moved forward slightly as the filing progresses in order to maintain effective contact between the file and the saws until the latter have been filed away to the desired extent. It will be observed, however, that the curvature of the periphery of the saw and the inclination of the file when resting upon the rib will cause the saw to contact with the upper edge of the file at a point nearer the front end of the latter than that point at which the saw-teeth would come in contact with the file at its lower edge. Therefore as the file is longitudinally tapered it would be wider at that point of its upper edge opposite the teeth, and consequently unless special provision is made the saw-teeth would not contact with the opposite sides of the file continuously from the upper to the lower faces thereof. In order, therefore, to compensate for this angular position of the file and for the curvature of the saw, I undercut or bevel the active side faces of the file, as indicated in Figs. 5 and 6, so that the width of the file at the advance point of its upper edge, which is disposed opposite the saw-teeth, will be the same as the width of the lower edge of the file at the somewhat less advanced point disposed opposite the teeth. In this manner I insure the maximum efficiency of the device by compelling active contact with the saw entirely across the working faces of the file.

In order to center the file between a pair of saws in order that the opposed sides thereof may be uniformly filed by the opposite sides of the device, the latter is provided at or adjacent to its narrow or front end with what may be termed a "centering device" composed in its preferred embodiment of a pair of oppositely-extending laterally-disposed centering or spacing screws 5 and 6, which are adjusted to contact with the adjacent side faces of the contiguous saws according to the distance apart at which the latter are placed in order to properly center the file between the saws in different makes of gins.

The centering device or the members thereof are adjusted to properly center the file between the saws, and said file is then pushed forward and positioned in accordance with a scale imprinted, stamped, or otherwise formed upon the upper face of the file, as best seen in Figs. 1 and 3 of the drawings.

In purchasing a side-filer for use in connection with any particular kind of gin the user is instructed respecting the extent to which the file must be passed between the saws to secure the requisite side-filing to obtain the best results in that particular class of gins, and the scale serves as an indication to aid in the proper positioning of the device to get the best results under all circumstances.

It is essential that the file be held steadily at work, as it is evident that the operation of side-filing must be conducted carefully in order to produce saw-teeth having exceedingly sharp points, and I therefore prefer to provide the file adjacent to its wide end or base with an adjustable support or rest 7, the construction of which may be varied between wide limits, but which preferably comprehends a headed bolt 8, passed through the file in a direction at right angles to the centering device and provided upon its upper end with a wing-nut 9, by means of which the adjustment of the bolt is effected. The manner of securing this adjustable support in its adjusted positions is not absolutely essential, so long as the desired end is attained; but I prefer to provide a series of washers 10 upon the bolt 8, between its head and the under face of the file, as shown in Fig. 2. Thus the front end of the file is supported upon the rib between two saws, and the rear end or base is steadied by the support 7, which slides upon the curved face of the rib at a point somewhat below the saw-teeth exposed above the rib.

When it is desired to side-file the saws without removing the saw-cylinder from the gin, the centering device is properly adjusted in accordance with the width of the spaces between the individual saws, and the operator, grasping the handle of the filer, introduces the narrow end of the file between a pair of saws until the proper graduation of the scale is disposed opposite the teeth, the proper inclination of the file being assured by reason of the fact that its front end is supported upon a rib directly and its rear end indirectly through the medium of the adjustable support. The saw-cylinder is now turned backward until the proper side-filing has been effected, when, as will be obvious, the file is passed into another interval between the saws, and the foregoing operation is repeated until all of the teeth of the several saws have been restored to their original condition. I have stated, however, that it is intended to utilize the device for side-filing the saws when the saw-cylinder is removed from the gin, and it is evident that in this event special provision must be made for the support of the file, because the ribs of the gin will not be available for this purpose. In Fig. 4 I have illustrated the manner in which the desired end is attained. The bolt 8 is first removed from the file and the washers 10 are slid from the bolt. An adjustable gage-bar 11, provided with an elongated slot 12, is then placed against the under face of the file and the screw 8 is passed through said slot and is restored to the file, with the washers 10 located between the file and the nut 9. The bolt 8 now serves as means for adjustably retaining the gage-bar upon the file, and as the front end 13 of the bar 11 is bent at right angles it may be hooked over a space-block c to retain the bar in position to constitute a support and gage for the file—that is to say, in this adaptation of the invention instead of moving the file forward until the teeth arrive opposite the proper graduation, as in the former instance, the gage-bar 11 is so adjusted as to bring the proper graduation of the file opposite the saw-teeth when the end 13 of the gage-bar is drawn against the space-block, as shown in Fig. 4, it being obvious that this form of the device may be quickly adapted for use in connection with different makes of gins by adjusting the file nearer to or farther from the bent or bearing end of the gage-bar.

In Figs. 8 and 9 I have illustrated the file as provided with a pair of removable faces or face-plates 14 and 15, screwed against the opposite sides of the file-body, which may be composed of any suitable material—as, for instance, wood or metal—but while this form may be preferable in order to permit the renewal of the working faces when worn the file may, if desired, be made solid.

In Fig. 10 of the drawings I have shown a still further development of the invention, which comprehends a series of files constructed in accordance with the preceding description, but having their shanks connected to a common support, strip, or handle 16, which serves to organize the files in a single structure adapted for simultaneously filing a number of saws—as, for instance, all of the individual saws or sections of a complete saw-cylinder. In this form of the invention it is evident that either the rests 7 may be employed when operating upon the saws while in the gin or one or more of the gage-bars may be employed in connection with this multiple form of my device to facilitate its use for filing a saw-cylinder supported upon the bench, it being evident that these rests and gage-bars are just as useful in connection with the multiple filer as they have been shown to be in connection with the single form.

From the foregoing it will appear that I have produced a novel, inexpensive, and highly efficient side-filing device for gin-saws and the like which may be used without special skill to restore the saw-teeth to their original forms either while the saws are mounted in the gin or when removed therefrom; but while the embodiments of my invention herein described and illustrated in the accompanying drawings are believed at this time to be preferable I do not wish to limit myself to the structural details defined, as many changes, modifications, and variations might be effected without departing from the spirit of the invention. For instance, the screws, which I have illustrated as serving to center the file between the saws, might be substituted by any other form of centering mechanism, the adjustable rest for supporting the base of the file upon the ribs might be substituted for many other forms of adjustable supporting means, the file might or might not be equipped with the removable face-plates, or said plates might be formed other than as shown in the drawings. Furthermore, the precise form and the manner of adjusting the gage-bar may be varied to accommodate the device for use in other relations than that specified, and in the multiple form of the invention the files may be connected to the support in a variety of ways, and the construction of such support may be changed as experience and experiment may dictate. I therefore reserve the right to effect any and all variations of both form and arrangement which may be properly comprehended within the scope of the protection prayed.

What I claim is—

1. A longitudinally-tapered side-filer having undercut or beveled file-faces at its opposite sides, and upper and lower faces of tapering form.

2. A side-filer for gin-saws comprising a file provided with means for accurately positioning the file to effect corresponding side-filing of adjacent saws.

3. A side-filer for gin-saws comprising a file and an adjustable centering device carried by the file and designed to bear against adjacent faces of a pair of saws to insure the proper location of the file.

4. A gin-saw side-filer comprising a longitudinally-tapered file and laterally-disposed adjustable centering members carried by the file adjacent to its narrow end to center the device between the opposed faces of a pair of saws.

5. A gin-saw side-filer comprising a longitudinally-tapered file provided with a scale to facilitate the proper degree of insertion of the file between a pair of saws.

6. A side-filer for gin-saws, comprising a longitudinally-tapered file provided with a scale on its upper face and with a centering device adjacent to one end.

7. A side-filer for gin-saws comprising a longitudinally-tapered file, and an adjustable rest or support extending below the file at one end to facilitate the proper location of the device upon the ribs of the gin.

8. A side-filer for gin-saws comprising a longitudinally-tapered file provided with a centering device at one end and with a rest or support at its opposite end, whereby said file may be supported in proper position upon a rib of the gin and may be accurately centered between two saws to effect the side-filing of the opposed faces thereof.

9. In a gin-saw side-filer, the combination with a longitudinally-tapered file having its side faces oppositely beveled and provided upon its upper face with a scale, of laterally-disposed adjustable centering members located at one end of the file, and a support or rest extending below the file adjacent to its opposite end.

10. A side-filer for gin-saws comprising a tapering file, means for supporting and centering the file between two saws, to effect corresponding side-filing of their adjacent faces, and a handle extending from the file at an angle.

11. In a gin-saw-filing device, the combination with a file and handle, of an adjustable gage-bar carried by the file and provided with an angular end designed to take over a space-block between the gin-saws, said file being provided with a scale for determining the adjustment of the gage-bar.

12. A gin-saw side-filer comprising a file and handle, a centering device carried by the file, and an adjustable gage-bar likewise carried by the file, whereby the latter may be retained in accurate position for the effective filing of the saw.

13. In a side-filer for gin-saws, the combination with a file provided with centering devices at one end, of an adjustable bolt at its opposite end designed to constitute a rest or support for the file, and an adjustable and removable gage-bar designed to be secured to the file by said bolt.

14. A gin-saw side-filing device comprising a common support and a series of longitudinally-tapered files extending from said support and provided with scales and centering devices.

15. A side-filer for gin-saws comprising a longitudinally-tapered file and an adjustable rest or support carried thereby to facilitate the proper location of the device upon the ribs of the gin.

16. A side-filer for gin-saws comprising a file, a supporting device carried thereby, and a centering device likewise carried by the file and disposed to center it accurately between two saws to effect corresponding side-filing of their adjacent faces.

17. In a gin-saw-filing device, the combination with a file, of an adjustable gage-bar carried by the file and provided with an angular end designed to take over a space-block between the gin-saws.

18. A gin-saw side-filing device comprising a common support, and a series of longitudinally-tapered files extending therefrom.

19. The combination with a pair of gin-saws in spaced relation, of means for simultaneously filing the adjacent faces of said saws.

In testimony that I claim the foregoing as my own I have hereto affixed my signature in the presence of two witnesses.

TURNER HUNT NANCE.

Witnesses:
W. H. BOYNTON,
A. J. BONIE.